(12) United States Patent
Hibino et al.

(10) Patent No.: US 10,570,799 B2
(45) Date of Patent: Feb. 25, 2020

(54) PURIFICATION CONTROL DEVICE

(71) Applicant: NGK SPARK PLUG CO., LTD., Nagoya-shi, Aichi (JP)

(72) Inventors: Yoshinori Hibino, Nagoya (JP); Kentaro Mori, Nagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 0 days.

(21) Appl. No.: 16/405,087

(22) Filed: May 7, 2019

(65) Prior Publication Data
US 2019/0345864 A1 Nov. 14, 2019

(30) Foreign Application Priority Data

May 9, 2018 (JP) .................................. 2018-090756

(51) Int. Cl.
*F01N 11/00* (2006.01)
*B01D 53/94* (2006.01)
*F01N 9/00* (2006.01)
*F01N 3/20* (2006.01)

(52) U.S. Cl.
CPC .......... *F01N 11/00* (2013.01); *B01D 53/9418* (2013.01); *B01D 53/9431* (2013.01); *B01D 53/9495* (2013.01); *F01N 3/208* (2013.01); *F01N 9/007* (2013.01)

(58) Field of Classification Search
CPC .......... F01N 3/208; F01N 9/007; F01N 11/00; B01D 53/9431; B01D 53/9495
USPC ................... 422/168; 60/274, 286, 300, 301
See application file for complete search history.

(56) References Cited

U.S. PATENT DOCUMENTS

| 8,161,730 B2 * | 4/2012 | Chi ..................... B01D 53/9409 60/286 |
| 2006/0130461 A1 * | 6/2006 | Gabrielsson ........... B01D 53/90 60/286 |
| 2011/0239627 A1 * | 10/2011 | Sisken .................... F01N 3/208 60/276 |
| 2013/0058840 A1 * | 3/2013 | Inoue ................. B01D 53/9477 422/182 |
| 2013/0074475 A1 * | 3/2013 | Inoue ................. B01D 53/9477 60/274 |

(Continued)

FOREIGN PATENT DOCUMENTS

JP 2015-197086 A 11/2015

*Primary Examiner* — Tom P Duong
(74) *Attorney, Agent, or Firm* — Sughrue Mion, PLLC

(57) ABSTRACT

A purification control device (12) controls a urea water injector (5) for supplying urea as a reducing agent to an SCR catalyst (4). The purification control device (12) sets a pre-deterioration maximum occlusion amount based on the SCR catalyst temperature, and estimates the concentration of ammonia discharged from the SCR catalyst (4), as an estimated ammonia concentration, based on upstream NOx concentration information, downstream NOx concentration information, urea injection amount information, the pre-deterioration maximum occlusion amount, and ammonia occlusion amount information. The purification control device (12) acquires downstream ammonia concentration information. When the downstream ammonia concentration is greater than the estimated ammonia concentration, the purification control device (12) decreases the supply amount of urea from the urea water injector (5).

6 Claims, 8 Drawing Sheets

(56) References Cited

U.S. PATENT DOCUMENTS

2014/0033683 A1\* 2/2014 Wei .................. F01N 3/208
 60/274
2016/0169073 A1\* 6/2016 Chanzy ............. F01N 3/2066
 60/274

\* cited by examiner

PURIFICATION CONTROL DEVICE

BACKGROUND OF THE INVENTION

1. Field of the Invention

The present invention relates to a purification control device which purifies NOx contained in an exhaust gas using a selective reduction catalyst.

2. Description of the Related Art

Patent Document 1 describes a purification system in which, for purifying NOx contained in an exhaust gas discharged from an internal combustion engine, a selective reduction catalyst is provided and urea is injected as a reducing agent to the selective reduction catalyst.

[Patent Document 1] Japanese Patent Application Laid-Open (kokai) No. 2015-197086

3. Problems to be Solved by the Invention

However, in such a purification system, if the selective reduction catalyst is deteriorated through use, the amount of ammonia that can be occluded in the selective reduction catalyst decreases. Therefore, in the case where the selective reduction catalyst is deteriorated, ammonia generated by injection of urea might be discharged from the selective reduction catalyst without being occluded in the selective reduction catalyst.

SUMMARY OF THE INVENTION

It is therefore an object of the present disclosure to suppress discharge of ammonia from a selective reduction catalyst when the selective reduction catalyst is deteriorated.

The above object has been achieved by providing (1) a purification control device which controls a urea supply device for supplying urea as a reducing agent to a selective reduction catalyst provided in an exhaust pipe of an internal combustion engine in order to purify NOx contained in an exhaust gas discharged from the internal combustion engine.

The purification control device according to the present disclosure includes a first information acquisition unit, an occlusion amount setting unit, an estimation unit, a second information acquisition unit, and a decreasing unit.

The first information acquisition unit is configured to acquire at least information that allows an upstream NOx concentration, a downstream NOx concentration, a supplied ammonia amount, and a catalyst temperature to be specified. The upstream NOx concentration is a concentration of NOx contained in the exhaust gas flowing into the selective reduction catalyst, the downstream NOx concentration is a concentration of NOx contained in the exhaust gas discharged from the selective reduction catalyst, the supplied ammonia amount is an amount of ammonia supplied to the selective reduction catalyst, and the catalyst temperature is a temperature of the selective reduction catalyst.

The occlusion amount setting unit is configured to set a pre-deterioration maximum occlusion amount based on at least the catalyst temperature, wherein the pre-deterioration maximum occlusion amount is a maximum value of an amount of ammonia to be occluded in the selective reduction catalyst before the selective reduction catalyst is deteriorated. The estimation unit is configured to estimate a concentration of ammonia discharged from the selective reduction catalyst, as an estimated ammonia concentration, based on at least information that allows the upstream NOx concentration to be specified, information that allows the downstream NOx concentration to be specified, information that allows the supplied ammonia amount to be specified, and the pre-deterioration maximum occlusion amount.

The second information acquisition unit is configured to acquire information that allows a downstream ammonia concentration to be specified, wherein the downstream ammonia concentration is a concentration of ammonia contained in the exhaust gas discharged from the selective reduction catalyst. The decreasing unit is configured to decrease a supply amount of urea from the urea supply device when the downstream ammonia concentration is greater than the estimated ammonia concentration.

The purification control device of the present disclosure configured as described above estimates the ammonia concentration based on the amount of ammonia (i.e., pre-deterioration maximum occlusion amount) that can be occluded by the selective reduction catalyst before the selective reduction catalyst is deteriorated. The pre-deterioration maximum occlusion amount is greater than the amount of ammonia that can be occluded when the selective reduction catalyst is deteriorated. Therefore, if the amount of ammonia that can be occluded by the selective reduction catalyst decreases as a result of deterioration of the selective reduction catalyst, the downstream ammonia concentration indicating the concentration of ammonia actually discharged from the selective reduction catalyst becomes greater than the estimated ammonia concentration. That is, in the purification control device of the present disclosure, if the downstream ammonia concentration is greater than the estimated ammonia concentration, a determination can be made that the selective reduction catalyst is deteriorated.

Then, if the downstream ammonia concentration is greater than the estimated ammonia concentration, the purification control device of the present disclosure decreases the supply amount of urea from the urea supply device. Thus, when the selective reduction catalyst is deteriorated, discharge of ammonia from the selective reduction catalyst can be suppressed.

In a preferred embodiment (2), the purification control device (1) further comprises a coefficient calculation unit configured to calculate, as a correction coefficient, a division value obtained by dividing the estimated ammonia concentration by the downstream ammonia concentration, and the decreasing unit decreases the supply amount based on the correction coefficient calculated by the coefficient calculation unit.

In the purification control device of the present disclosure configured as described above, as the downstream ammonia concentration increases as compared to the estimated ammonia concentration, the correction coefficient decreases. Therefore, by decreasing the supply amount based on the correction coefficient, the purification control device of the present disclosure can decrease the supply amount of urea as the downstream ammonia concentration increases. Thus, in accordance with the deterioration degree of the selective reduction catalyst, the purification control device of the present disclosure can suppress the discharge of ammonia from the selective reduction catalyst.

In another preferred embodiment (3) of the purification control device (2) above, the coefficient calculation unit repeatedly calculates the division value obtained by dividing the estimated ammonia concentration by the downstream ammonia concentration, for a number of times of calculations set to be greater than 1 in advance, and calculates an average of the calculated division values, as the correction coefficient.

The purification control device of the present disclosure configured as described above smooths time-series data of the division values, whereby a sharp change in the correction coefficient can be suppressed.

In yet another preferred embodiment (4) of the purification control device (2) above, with a concentration peak time defined as a time when the estimated ammonia concentration is at a peak, the coefficient calculation unit calculates, as the correction coefficient, the division value obtained by dividing the estimated ammonia concentration at the concentration peak time by the downstream ammonia concentration at the concentration peak time.

In the purification control device of the present disclosure configured as described above, the correction coefficient is calculated when the downstream ammonia concentration is also at a high value close to the peak. Therefore, a detection result of the downstream ammonia concentration is less likely to be influenced by noise, whereby the purification control device of the present disclosure can suppress a decrease in reliability of the correction coefficient.

In yet another preferred embodiment (5), the purification control device of any of (2) to (4) above further comprises a prohibition unit configured to determine whether or not the estimated ammonia concentration is equal to or smaller than a predetermined start determination concentration, and to prohibit calculation of the correction coefficient by the coefficient calculation unit when the estimated ammonia concentration is equal to or smaller than the start determination concentration.

In the purification control device of the present disclosure configured as described above, the correction coefficient is calculated when the downstream ammonia concentration is greater than the start determination concentration. Therefore, a detection result of the downstream ammonia concentration is less likely to be influenced by noise, whereby the purification control device of the present disclosure can suppress a decrease in reliability of the correction coefficient.

In yet another preferred aspect (6), the purification control device of any of (2) to (5) above further comprises a target setting unit and a supply amount control unit. The decreasing unit decreases the supply amount by updating the target occlusion amount using, as a new target occlusion amount, a value obtained by multiplying the target occlusion amount and the correction coefficient. The target setting unit is configured to set a target occlusion amount which is a target value for an amount of ammonia to be occluded in the selective reduction catalyst. The supply amount control unit is configured to control the supply amount so that the amount of ammonia to be occluded in the selective reduction catalyst coincides with the target occlusion amount.

The purification control device of the present disclosure configured as described above can decrease the supply amount through a simple calculation of multiplying the target occlusion amount by the correction coefficient, whereby the processing load on the purification control device can be decreased.

DESCRIPTION OF REFERENCE NUMERALS

Figure 1:
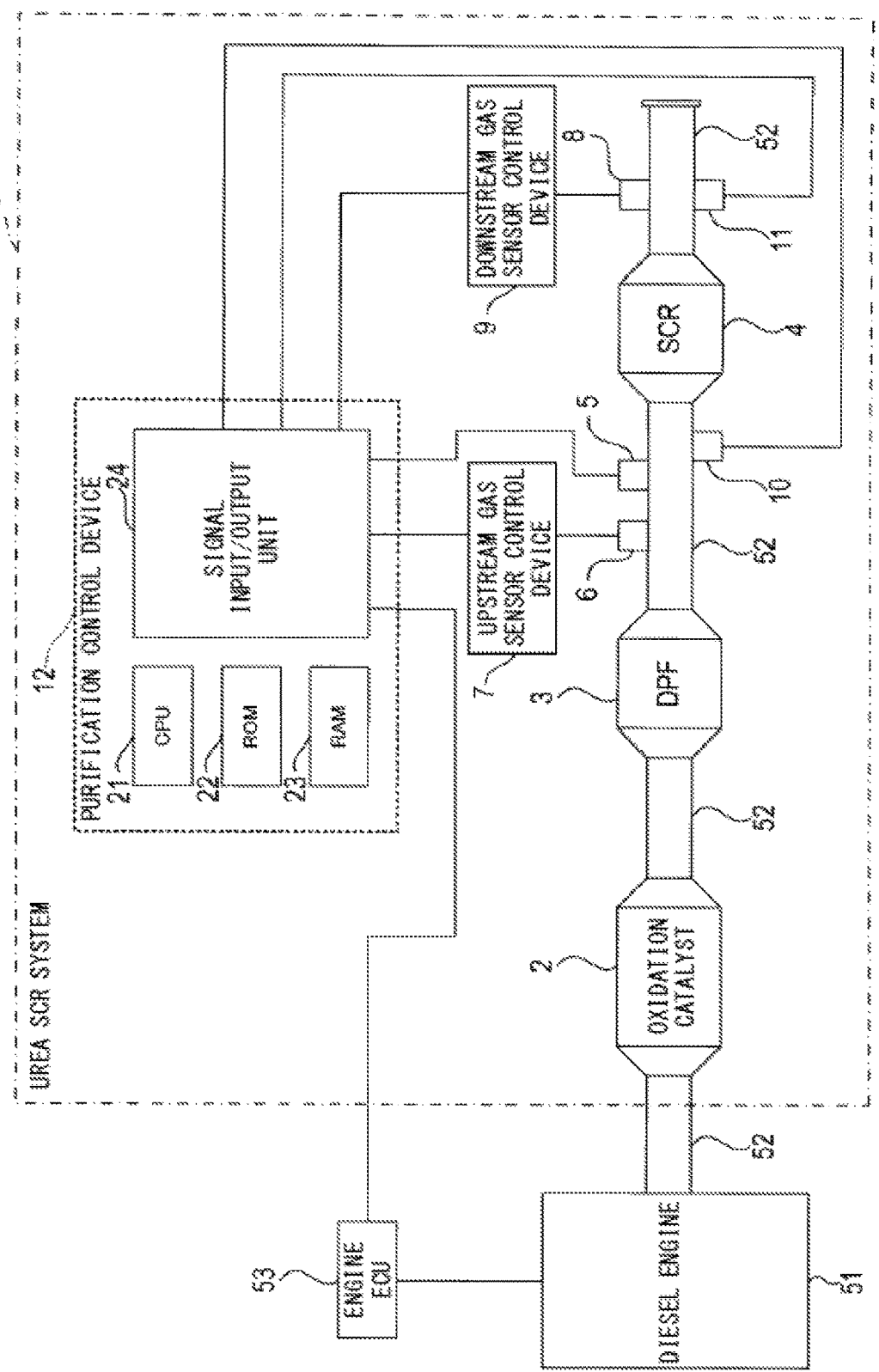
FIG. 1 is a view showing a schematic configuration of a urea SCR system 1.

Reference numerals used to identify various features in the drawings include the following.
4: SCR catalyst
5: urea water injector
12: purification control device
51: diesel engine
52: exhaust pipe

DETAILED DESCRIPTION OF THE PREFERRED EMBODIMENTS

Hereinafter, embodiments of the present disclosure will be described in greater detail with reference to the drawings. However, the present disclosure should not be construed as being limited thereto.

As shown in FIG. 1, a urea SCR system 1 according to the present embodiment includes an oxidation catalyst 2, a DPF 3, an SCR catalyst 4, a urea water injector 5, an upstream multi-gas sensor 6, an upstream gas sensor control device 7, a downstream multi-gas sensor 8, a downstream gas sensor control device 9, an upstream temperature sensor 10, a downstream temperature sensor 11, and a purification control device 12. SCR is an abbreviation for Selective Catalytic Reduction. DPF is an abbreviation for Diesel Particulate Filter.

The oxidation catalyst 2 receives exhaust gas discharged from a diesel engine 51, via an exhaust pipe 52 of the diesel engine 51, and oxidizes nitric oxide (NO) in the exhaust gas to generate nitrogen dioxide ($NO_2$).

The DPF 3 receives the exhaust gas discharged from the oxidation catalyst 2, via the exhaust pipe 52, and removes particulates from the exhaust gas.

The SCR catalyst 4 hydrolyzes urea supplied from the upstream side into ammonia, receiving the exhaust gas discharged from the DPF 3, via the exhaust pipe 52, and then reducing NOx in the exhaust gas by reaction with the ammonia, thereby converting NOx into nitrogen gas and water vapor. Thus, the SCR catalyst 4 discharges the exhaust gas in which NOx has been reduced.

The urea water injector 5 is provided between the DPF 3 and the SCR catalyst 4 in the exhaust pipe 52, and injects urea water into the exhaust gas. The injected urea water is hydrolyzed under high temperature, whereby ammonia gas is generated. The ammonia gas is used as a reducing agent for reducing NOx.

The upstream multi-gas sensor 6 is provided between the DPF 3 and the SCR catalyst 4 in the exhaust pipe 52, and detects the NOx concentration and the $NO_2$ concentration in the exhaust gas discharged from the DPF 3.

The upstream gas sensor control device 7 controls the upstream multi-gas sensor 6, and calculates the NO concentration (hereinafter, upstream NO concentration), the $NO_2$ concentration (hereinafter, upstream $NO_2$ concentration), and the NOx concentration (hereinafter, upstream NOx concentration) in the exhaust gas discharged from the DPF 3, based on a detection result of the upstream multi-gas sensor 6. The upstream gas sensor control device 7 is configured to transmit and receive data to and from the purification control device 12 via a communication line, and transmits upstream NO concentration information indicating the upstream NO concentration, upstream $NO_2$ concentration information indicating the upstream $NO_2$ concentration, and upstream NOx concentration information indicating the upstream NOx concentration, to the purification control device 12.

The downstream multi-gas sensor 8 is provided upstream of the SCR catalyst 4 in the exhaust pipe 52, and detects the NOx concentration, the $NO_2$ concentration, and the ammonia concentration in the exhaust gas discharged from the SCR catalyst 4.

The downstream gas sensor control device 9 controls the downstream multi-gas sensor 8, and calculates the NOx concentration (hereinafter, downstream NOx concentration), the NO concentration (hereinafter, downstream NO concentration), the $NO_2$ concentration (hereinafter, downstream $NO_2$ concentration), and the ammonia concentration (hereinafter, downstream ammonia concentration) in the exhaust gas discharged from the SCR catalyst 4, based on a detection result of the downstream multi-gas sensor 8. The downstream gas sensor control device 9 is configured to transmit and receive data to and from the purification control device 12 via a communication line, and transmits downstream NOx concentration information indicating the downstream NOx concentration, downstream NO concentration information indicating the downstream NO concentration, downstream $NO_2$ concentration information indicating the downstream $NO_2$ concentration, and downstream ammonia concentration information indicating the downstream ammonia concentration, to the purification control device 12.

The upstream temperature sensor 10 detects the temperature of the exhaust gas flowing into the SCR catalyst 4, and outputs an upstream gas temperature signal indicating the temperature of the exhaust gas.

The downstream temperature sensor 11 detects the temperature of the exhaust gas discharged from the SCR catalyst 4, and outputs a downstream gas temperature signal indicating the temperature of the exhaust gas.

The purification control device 12 is configured to include, as main parts, a microcomputer including a CPU 21, a ROM 22, a RAM 23, a signal input/output unit 24, and the like. The functions of the microcomputer are implemented by the CPU 21 executing a program stored in a non-transient substantive storage medium. In this example, the ROM 22 corresponds to the non-transient substantive storage medium having the program stored therein. In addition, by executing this program, a method corresponding to the program is executed. It is noted that some or all of the functions executed by the CPU 21 may be implemented by hardware using one or a plurality of ICs, etc. In addition, the number of microcomputers configuring the purification control device 12 may be one or plural.

The urea water injector 5, the upstream gas sensor control device 7, the downstream gas sensor control device 9, the upstream temperature sensor 10, and the downstream temperature sensor 11 are connected to the signal input/output unit 24.

The purification control device 12 is configured to transmit and receive data to and from the upstream gas sensor control device 7 and the downstream gas sensor control device 9 via communication lines. Further, the purification control device 12 is configured to perform, via a communication line, transmission and reception of data to and from an electronic control device 53 which controls the diesel engine 51. Hereinafter, the electronic control device 53 is referred to as engine ECU 53. ECU is an abbreviation for Electronic Control Unit.

Figure 2:
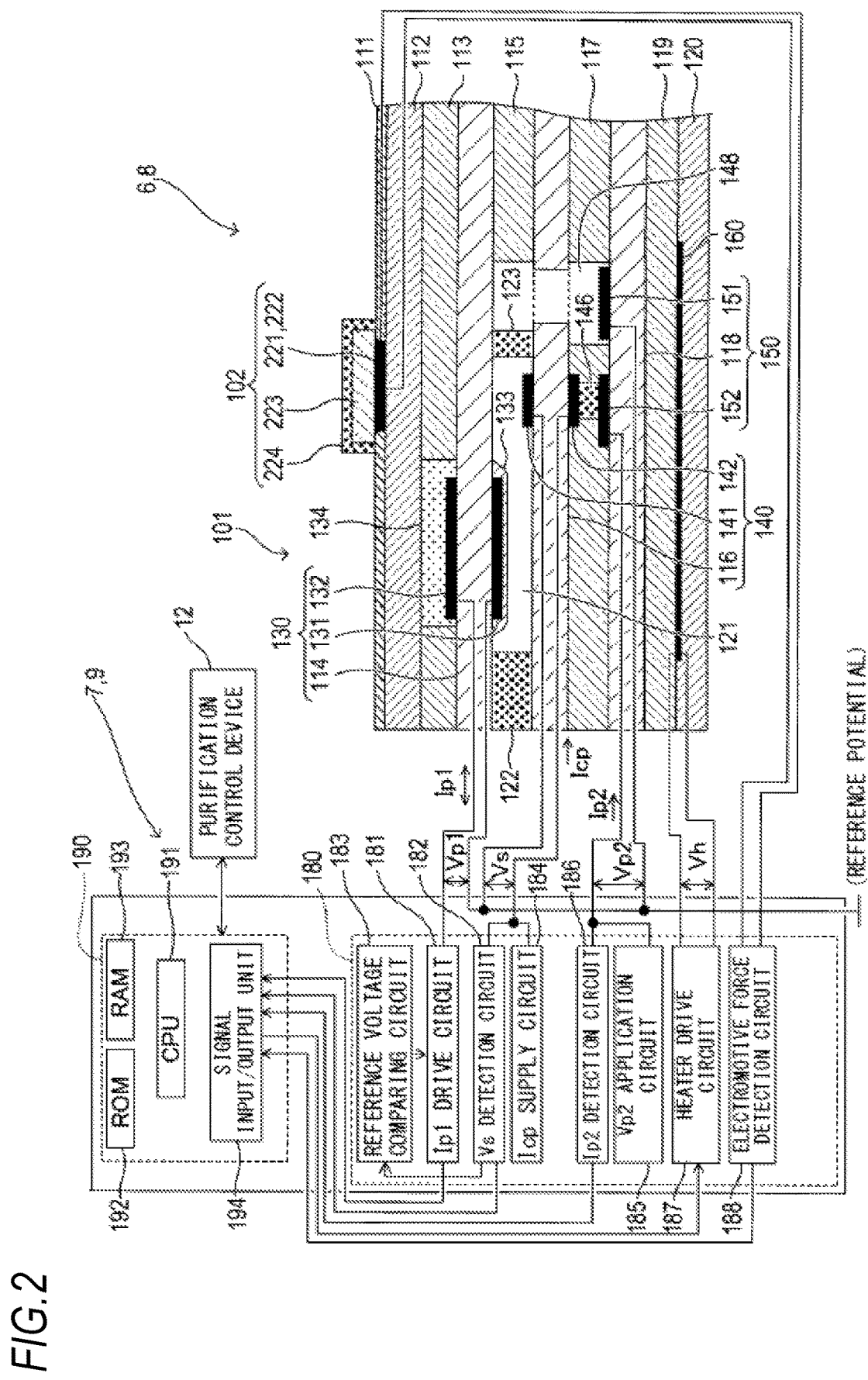
FIG. 2 is a view showing a schematic configuration of sensors 6, 8 and sensor control devices 7, 9.

As shown in FIG. 2, the upstream multi-gas sensor 6 and the downstream multi-gas sensor 8 each include a NOx detection unit 101 and an ammonia detection unit 102.

The NOx detection unit 101 is formed from an insulating layer 111, a solid electrolyte layer 112, an insulating layer 113, a solid electrolyte layer 114, an insulating layer 115, a solid electrolyte layer 116, an insulating layer 117, a solid electrolyte layer 118, an insulating layer 119, and an insulating layer 120, which are laminated in order. The insulating layers 111, 113, 115, 117, 119, 120 are formed from alumina as a main component. The solid electrolyte layers 112, 114, 116, 118 are formed from zirconia having oxygen ion conductivity, as a main component.

The NOx detection unit 101 includes a first measurement chamber 121 formed between the solid electrolyte layer 114 and the solid electrolyte layer 116. The NOx detection unit 101 introduces the exhaust gas into the first measurement chamber 121 from outside via a diffusion resistor body 122 which is provided between the solid electrolyte layer 114 and the solid electrolyte layer 116 so as to be adjacent to the first measurement chamber 121. The NOx detection unit 101 discharges the exhaust gas out of the first measurement chamber 121 via a diffusion resistor body 123 which is provided between the solid electrolyte layer 114 and the solid electrolyte layer 116 so as to be adjacent to the first measurement chamber 121 on the side, of the first measurement chamber 121, that is opposite the diffusion resistor body 122. The diffusion resistor bodies 122, 123 are formed from a porous material such as alumina.

The NOx detection unit 101 includes a first pumping cell 130. The first pumping cell 130 includes the solid electrolyte layer 114 and pumping electrodes 131, 132. The pumping electrodes 131, 132 are formed from platinum as a main material. The pumping electrode 131 is provided on a surface, of the solid electrolyte layer 114, that is in contact with the first measurement chamber 121. A surface of the pumping electrode 131 on the first measurement chamber 121 side is covered by a protection layer 133 formed from a porous material. The pumping electrode 132 is provided on a surface of the solid electrolyte layer 114 on the side, of the solid electrolyte layer 114, that is opposite the pumping electrode 131. The insulating layer 113 in an area where the pumping electrode 132 is provided and the surrounding area thereof, is removed, and a porous material 134 fills the area instead of the insulating layer 113. The porous material 134 allows a gas (oxygen) to enter/exit between the pumping electrode 132 and outside the NOx detection unit 101.

The NOx detection unit 101 includes an oxygen concentration detection cell 140. The oxygen concentration detection cell 140 includes the solid electrolyte layer 116, a detection electrode 141, and a reference electrode 142. The detection electrode 141 and the reference electrode 142 are formed from platinum as a main material. The detection electrode 141 is provided on a surface, of the solid electrolyte layer 116, that is in contact with the first measurement chamber 121, such that the detection electrode 141 is located downstream of the pumping electrode 131 in the first measurement chamber 121 (i.e., on a side closer to the diffusion resistor body 123 than to the diffusion resistor body 122). The reference electrode 142 is provided on a surface of the solid electrolyte layer 116 on the side, of the solid electrolyte layer 116, that is opposite the detection electrode 141.

The NOx detection unit 101 includes a reference oxygen chamber 146. The reference oxygen chamber 146 is formed between the solid electrolyte layer 116 and the solid electrolyte layer 118 so as to be in contact with the reference electrode 142. The inside of the reference oxygen chamber 146 is filled with a porous material.

The NOx detection unit 101 includes a second measurement chamber 148. The second measurement chamber 148 is formed between the solid electrolyte layer 114 and the solid electrolyte layer 118 so as to penetrate through the insulating layer 115, the solid electrolyte layer 116, and the insulating layer 117. The NOx detection unit 101 introduces, into the second measurement chamber 148, the exhaust gas discharged from the first measurement chamber 121 via the diffusion resistor body 123.

The NOx detection unit 101 includes a second pumping cell 150. The second pumping cell 150 includes the solid electrolyte layer 118 and pumping electrodes 151, 152. The pumping electrodes 151, 152 are formed from platinum as a main material. The pumping electrode 151 is provided on a surface, of the solid electrolyte layer 118, that is in contact with the second measurement chamber 148. The pumping electrode 152 is provided on the surface of the solid electrolyte layer 118 on the side, of the reference oxygen chamber 146, that is opposite the reference electrode 142.

The NOx detection unit 101 includes a heater 160. The heater 160 is a heat generation resistor body which is formed from platinum as a main material and generates heat when energized. The heater 160 is provided between the insulating layer 119 and the insulating layer 120.

The ammonia detection unit 102 includes a detection electrode 221, a reference electrode 222, a selective reaction layer 223, and a diffusion layer 224.

Figure 3:
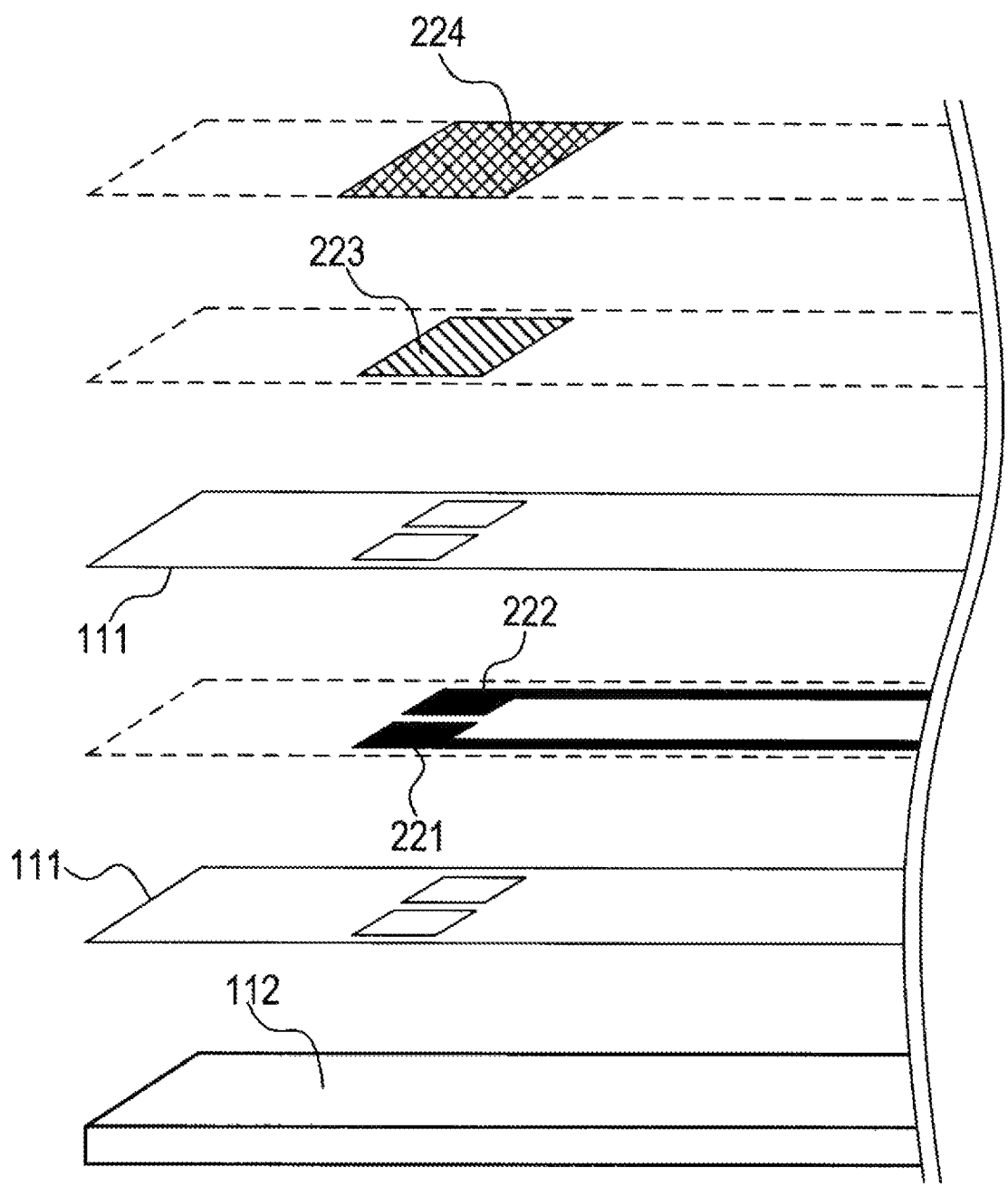
FIG. 3 is a development view showing a schematic structure of an ammonia detection unit 102.

As shown in FIG. 3, the detection electrode 221 and the reference electrode 222 are provided above the solid electrolyte layer 112 so as to be separated from each other. The detection electrode 221 is formed from a material containing gold as a main component. The reference electrode 222 is formed from a material containing platinum as a main component. The detection electrode 221 is more reactive with ammonia than the reference electrode 222, and therefore an electromotive force is generated between the detection electrode 221 and the reference electrode 222.

The selective reaction layer 223 is formed from a metal oxide as a main component, and is provided so as to cover the detection electrode 221 and the reference electrode 222. The selective reaction layer 223 has a function of causing combustion of an inflammable gas component other than ammonia. That is, owing to the selective reaction layer 223, the ammonia detection unit 102 can detect ammonia in the exhaust gas without being influenced by such an inflammable gas component.

The diffusion layer 224 is formed from a porous material and is provided so as to cover the selective reaction layer 223. The diffusion layer 224 is configured to adjust the diffusion speed of the exhaust gas flowing into the ammonia detection unit 102 from outside the NOx detection unit 101.

As shown in FIG. 2, the upstream gas sensor control device 7 and the downstream gas sensor control device 9 each include a control circuit 180 and a microcomputer 190 (hereinafter, microcomputer 190).

The control circuit 180 is an analog circuit provided on a circuit board. The control circuit 180 includes an Ip1 drive circuit 181, a Vs detection circuit 182, a reference voltage comparing circuit 183, an Icp supply circuit 184, a Vp2 application circuit 185, an Ip2 detection circuit 186, a heater drive circuit 187, and an electromotive force detection circuit 188.

The pumping electrode 131, the detection electrode 141, and the pumping electrode 151 are connected to a reference potential. The pumping electrode 132 is connected to the Ip1 drive circuit 181. The reference electrode 142 is connected to the Vs detection circuit 182 and the Icp supply circuit 184. The pumping electrode 152 is connected to the Vp2 application circuit 185 and the Ip2 detection circuit 186. The heater 160 is connected to the heater drive circuit 187. The ammonia detection unit 102 is connected to the electromotive force detection circuit 188.

The Ip1 drive circuit 181 supplies a first pumping current Ip1 between the pumping electrode 131 and the pumping electrode 132, and detects the supplied first pumping current Ip1.

The Vs detection circuit 182 detects the voltage Vs between the detection electrode 141 and the reference electrode 142, and outputs a detection result to the reference voltage comparing circuit 183.

The reference voltage comparing circuit 183 compares the reference voltage (for example, 425 mV) and the output (voltage Vs) of the Vs detection circuit 182, and outputs a result of the comparison to the Ip1 drive circuit 181. Then the Ip1 drive circuit 181 controls the flow direction of the first pumping current Ip1 and the magnitude of the first pumping current Ip1 so that the voltage Vs becomes equal to the reference voltage, and adjusts the oxygen concentration in the first measurement chamber 121 to a predetermined value at which NOx is not decomposed.

The Icp supply circuit 184 causes a weak current Icp to flow between the detection electrode 141 and the reference electrode 142. Thus, oxygen is transported from the first measurement chamber 121 via the solid electrolyte layer 116 into the reference oxygen chamber 146, whereby the reference oxygen chamber 146 is set to a predetermined oxygen concentration as a reference.

The Vp2 application circuit 185 applies a constant voltage Vp2 (for example, 450 mV) between the pumping electrode 151 and the pumping electrode 152. Thus, in the second measurement chamber 148, NOx is dissociated (reduced) by catalytic action of the pumping electrodes 151, 152 constituting the second pumping cell 150. Oxygen ions generated by the dissociation move in the solid electrolyte layer 118 between the pumping electrode 151 and the pumping electrode 152, whereby a second pumping current Ip2 flows. The Ip2 detection circuit 186 detects the second pumping current Ip2.

The heater drive circuit 187 applies a positive voltage for heater energization, to one end of the heater 160 which is a heat generation resistor body, and applies a negative voltage for heater energization, to the other end of the heater 160, thereby driving the heater 160.

The electromotive force detection circuit 188 detects an electromotive force (hereinafter, ammonia electromotive force EMF) between the detection electrode 221 and the reference electrode 222, and outputs a signal indicating a detection result, to a signal input/output unit 194 of the microcomputer 190.

The microcomputer 190 includes a CPU 191, a ROM 192, a RAM 193, and the signal input/output unit 194.

The CPU 191 executes a process for controlling the upstream multi-gas sensor 6 or the downstream multi-gas sensor 8, based on a program stored in the ROM 192. The signal input/output unit 194 is connected to the Ip1 drive circuit 181, the Vs detection circuit 182, the Ip2 detection circuit 186, the heater drive circuit 187, and the electromotive force detection circuit 188.

The CPU 191 calculates the NOx concentration, the $NO_2$ concentration, and the ammonia concentration in the exhaust gas based on signals inputted from the circuits 181, 182, 186, 188 via the signal input/output unit 194. The CPU 191 outputs a drive signal to the heater drive circuit 187 via the signal input/output unit 194, thereby controlling the heater 160.

Figure 4:
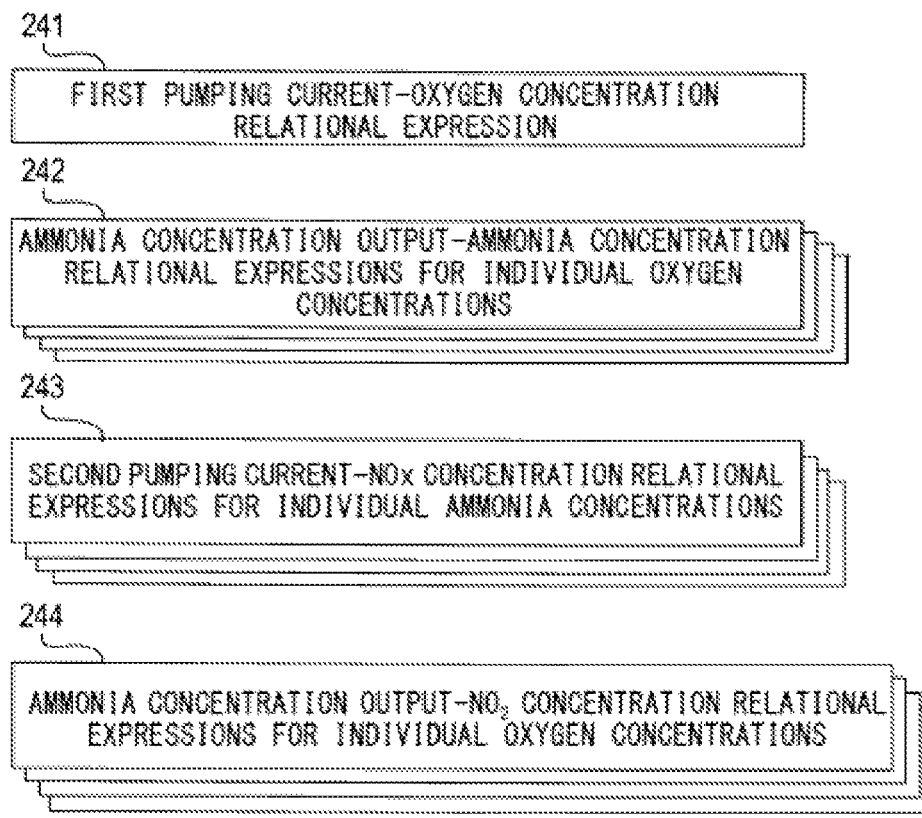
FIG. 4 is a block diagram showing a configuration of various data stored in the sensor control devices 7, 9.

As shown in FIG. 4, the ROM 192 of the microcomputer 190 stores a "first pumping current (Ip1)-oxygen concentration relational expression" 241, "ammonia concentration output (electromotive force EMF)-ammonia concentration relational expressions" 242, "second pumping current (Ip2)-NOx concentration relational expressions" 243, and "ammonia concentration output-$NO_2$ concentration relational expressions" 244.

The "first pumping current (Ip1)-oxygen concentration relational expression" 241 is a relational expression between the first pumping current (Ip1) and the oxygen concentration in the exhaust gas. The oxygen concentration in the exhaust gas may be calculated based on the "first pumping current-oxygen concentration relational expression" 241.

A plurality of the "ammonia concentration output-ammonia concentration relational expressions" 242 are set for individual oxygen concentrations, and are relational expressions between the ammonia concentration output from the ammonia detection unit 102 and the ammonia concentration in the exhaust gas. On the basis of the relational expressions, it is possible to calculate an accurate ammonia concentration without being influenced by the oxygen concentration in the exhaust gas.

In addition, the microcomputer 190 calculates the NOx concentration and the $NO_2$ concentration using a plurality of "second pumping current (Ip2)-NOx concentration relational expressions" 243 set for individual ammonia concentrations, and a plurality of "ammonia concentration output-$NO_2$ concentration relational expressions" 244 set for individual oxygen concentrations.

In addition, the microcomputer 190 of the upstream gas sensor control device 7 executes an upstream gas concentration calculation process.

Here, the procedure of the upstream gas concentration calculation process will be described. Execution of the upstream gas concentration calculation process is initiated immediately after start up of the microcomputer 190 of the upstream gas sensor control device 7.

Figure 5:
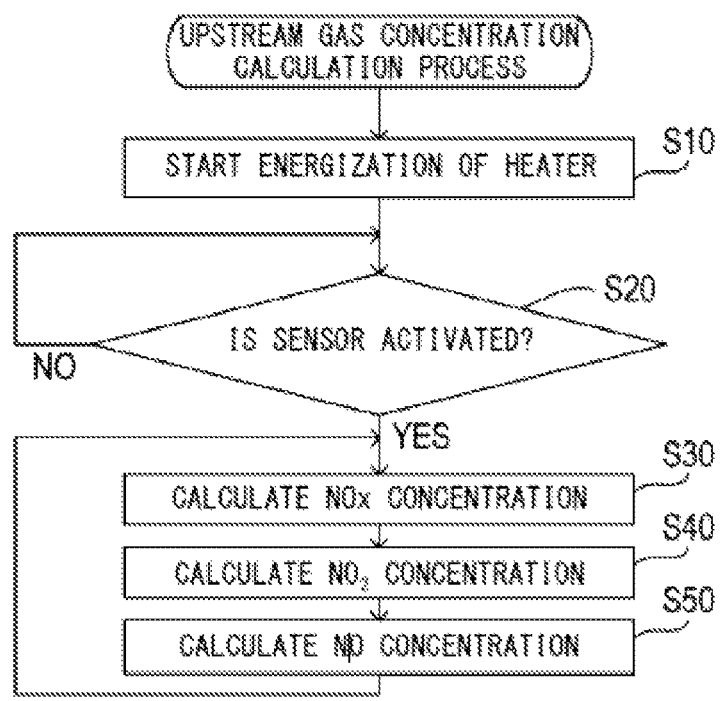
FIG. 5 is a flowchart showing an upstream gas concentration calculation process.

When the upstream gas concentration calculation process is executed, as shown in FIG. 5, first, in S10, the CPU 191 of the microcomputer 190 begins to output a heater ON signal to the heater drive circuit 187 so as to instruct the heater drive circuit 187 to energize the heater 160 which is a heat generation resistor body. Thus, energization of the heater 160 is started and the heater 160 heats the upstream multi-gas sensor 6.

Then, in S20, whether or not the upstream multi-gas sensor 6 has been activated is determined. Specifically, if the upstream multi-gas sensor 6 reaches an activation temperature, a determination is made that the upstream multi-gas sensor 6 has been activated. Here, if the upstream multi-gas sensor 6 has not yet been activated, the processing in S20 is repeated to wait until the upstream multi-gas sensor 6 is activated. Then, when the upstream multi-gas sensor 6 is activated, in S30, the NOx concentration in the exhaust gas is calculated based on the "first pumping current (Ip1)-oxygen concentration relational expression" 241, the "ammonia concentration output (electromotive force EMF)-ammonia concentration relational expression" 242, and the "second pumping current (Ip2)-NOx concentration relational expression" 243.

Next, in S40, the $NO_2$ concentration in the exhaust gas is calculated using the "ammonia concentration output-$NO_2$ concentration relational expression" 244.

Further, in S50, the NO concentration in the exhaust gas is calculated, and then the process returns to S30. Specifically, the $NO_2$ concentration calculated in S40 is subtracted from the NOx concentration calculated in S30, and the resultant value of the subtraction is used as the NO concentration.

The microcomputer 190 of the downstream gas sensor control device 9 executes a downstream gas concentration calculation process.

Here, the procedure of the downstream gas concentration calculation process will be described. Execution of the downstream gas concentration calculation process is initiated immediately after start up of the microcomputer 190 of the downstream gas sensor control device 9.

Figure 6:
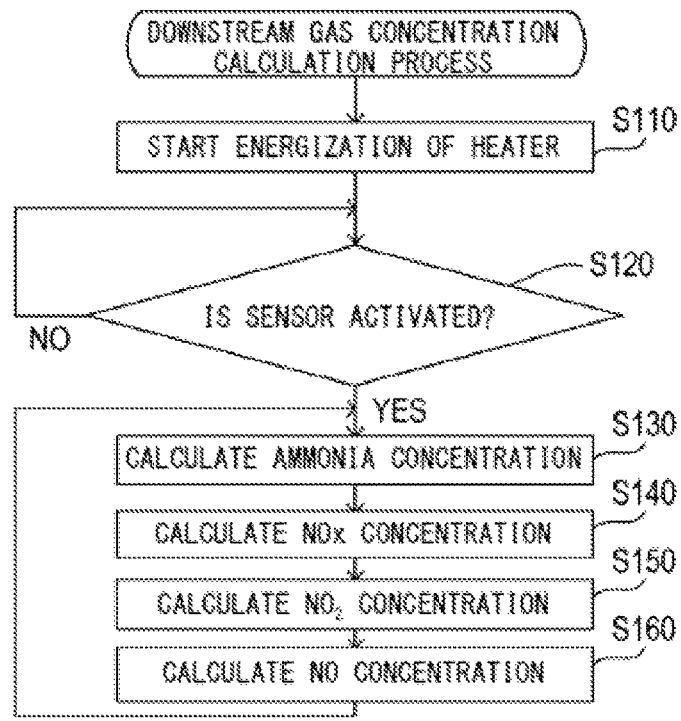
FIG. 6 is a flowchart showing a downstream gas concentration calculation process.

When the downstream gas concentration calculation process is executed, as shown in FIG. 6, first, in S110, the CPU 191 of the microcomputer 190 starts to output a heater ON signal to the heater drive circuit 187, as in S10. Thus, energization of the heater 160 is started and the heater 160 heats the downstream multi-gas sensor 8.

Then, in S120, whether or not the downstream multi-gas sensor 8 has been activated is determined as in S20. Here, if the downstream multi-gas sensor 8 has not yet been activated, the processing in S120 is repeated until the downstream multi-gas sensor 8 is activated. Then, when the downstream multi-gas sensor 8 is activated, in S130, as described above, the ammonia concentration is calculated based on the "first pumping current (Ip1)-oxygen concentration relational expression" 241 and the "ammonia concentration output-ammonia concentration relational expression" 242.

Next, in S140, the NOx concentration is calculated based on the "second pumping current (Ip2)-NOx concentration relational expression" 243. Further, in S150, the $NO_2$ concentration is calculated based on the ammonia concentration output-$NO_2$ concentration relational expression" 244. Then, in S160, the NO concentration in the exhaust gas is calculated, and then the process returns to S130. Specifically, the $NO_2$ concentration calculated in S150 is subtracted from the NOx concentration calculated in S140, and the resultant value of the subtraction is used as the NO concentration.

The purification control device 12 executes an injection control process for controlling the injection of urea water from the urea water injector 5.

Here, the procedure of the injection control process will be described. The injection control process is repeatedly executed every certain period (for example, 10 ms) during operation of the purification control device 12.

Figure 7:
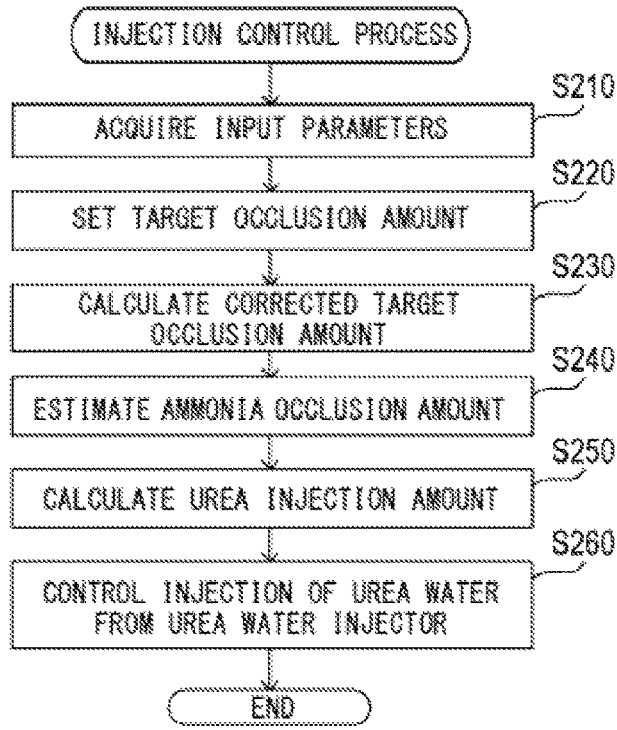
FIG. 7 is a flowchart showing an injection control process.

When the injection control process is executed, as shown in FIG. 7, first, in S210, the CPU 21 of the purification control device 12 performs processing of acquiring input parameters. Specifically, the input parameters are information indicating the upstream gas temperature, the downstream gas temperature, the exhaust gas flow rate, the upstream NO concentration, the upstream $NO_2$ concentration, the downstream NO concentration, the downstream $NO_2$ concentration, and the downstream ammonia concentration.

The CPU 21 acquires information (hereinafter, upstream gas temperature information) indicating the upstream gas temperature, from the upstream gas temperature signal inputted from the upstream temperature sensor 10. The CPU 21 acquires information (hereinafter, downstream gas temperature information) indicating the downstream gas temperature, from the downstream gas temperature signal inputted from the downstream temperature sensor 11. The CPU 21 acquires information (hereinafter, exhaust gas flow rate information) indicating the exhaust gas flow rate, through communication performed with the electronic control device 53. The CPU 21 acquires information (hereinafter, upstream NO concentration information) indicating the upstream NO concentration and information (hereinafter, upstream $NO_2$ concentration information) indicating the upstream $NO_2$ concentration, through communication performed with the upstream gas sensor control device 7. The CPU 21 acquires information (hereinafter, referred to as downstream NO concentration information) indicating the downstream NO concentration, information (hereinafter, downstream $NO_2$ concentration information) indicating the downstream $NO_2$ concentration, and information (hereinafter, downstream ammonia concentration information) indicating the downstream ammonia concentration, through communication performed with the downstream gas sensor control device 9.

Then, in S220, a target value (hereinafter, target occlusion amount) for the amount of ammonia to be occluded in the SCR catalyst 4 is set. In S220, first, based on the upstream gas temperature information and the downstream gas temperature information acquired in S210, the average of the upstream gas temperature and the downstream gas temperature is calculated as the temperature (hereinafter, SCR catalyst temperature) of the SCR catalyst 4. Next, using the calculated SCR catalyst temperature, the target occlusion amount is set by referring to a target occlusion amount setting map in which the correspondence relationship between the SCR catalyst temperature and the target occlusion amount is set in advance. The target occlusion amount setting map is stored in the ROM 22.

Further, in S230, a corrected target occlusion amount is calculated. Specifically, a multiplication value obtained by multiplying the target occlusion amount set in S220 and a correction coefficient Cc described below is calculated as the corrected target occlusion amount. The correction coefficient Cc is stored in the RAM 23 and is set at "1" as an initial value.

In addition, in S240, the amount of ammonia (hereinafter, ammonia occlusion amount) occluded in the SCR catalyst 4 is estimated on the basis of: the exhaust gas flow rate information, the upstream NO concentration information, the upstream $NO_2$ concentration information, the downstream NO concentration information, the downstream $NO_2$ concentration information, and the downstream ammonia concentration information acquired in S210; and a urea injection amount. The urea injection amount is calculated by processing in S250 described below. In S230, the latest value of the urea injection amount calculated in S250 is used.

Figure 8:
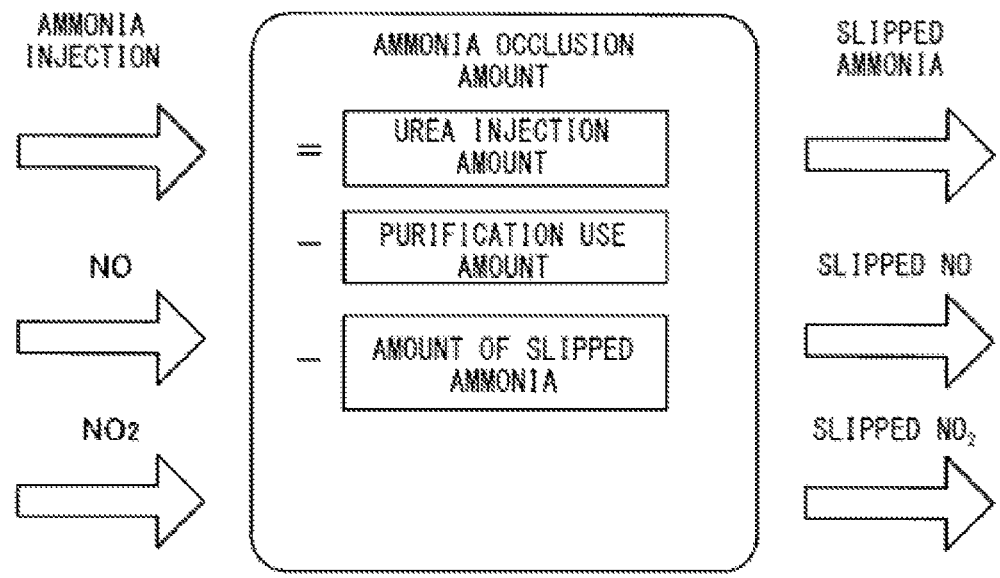
FIG. 8 is a diagram showing a method for calculating an ammonia occlusion amount.

Specifically, as shown in FIG. 8, the ammonia occlusion amount is calculated by subtracting a purification use amount and the amount of slipped ammonia from the urea injection amount. The purification use amount is the amount of ammonia used for purifying NO and $NO_2$ in the SCR catalyst 4, and is calculated using reaction formulae (1), (2), (3).

$$2NH_3+NO+NO_2 \rightarrow 2N_2+3H_2O \quad (1)$$

$$4NH_3+4NO+O_2 \rightarrow 4N_2+6H_2O \quad (2)$$

$$8NH_3+6NO_2 \rightarrow 7N_2+12H_2O \quad (3)$$

Next, a specific example of a calculation method for calculating the ammonia occlusion amount will be described.

For example, the exhaust gas flow rate indicated by the exhaust gas flow rate information acquired in S210 is assumed to be 5.5238 [g/s]. The upstream NO concentration indicated by the upstream NO concentration information acquired in S210 is assumed to be 14.5 [ppm]. The upstream $NO_2$ concentration indicated by the upstream $NO_2$ concentration information acquired in S210 is assumed to be 41.5 [ppm]. The downstream NO concentration indicated by the downstream NO concentration information acquired in S210 is assumed to be 15.0 [ppm]. The downstream $NO_2$ concentration indicated by the downstream $NO_2$ concentration information acquired in S210 is assumed to be 5.0 [ppm]. The downstream ammonia concentration indicated by the downstream ammonia concentration information acquired in S210 is assumed to be 14.5 [ppm]. The latest urea injection amount calculated in S250 is assumed to be 0.195 [g/s].

First, as shown in the following formula (4), from the urea injection amount, an $NH_3$ molar concentration per second is calculated. In formula (4), "0.325" indicates the proportion of ammonia contained in urea. In formula (4), "60" indicates the molar mass of urea.

$$NH_3 \text{ molar concentration [ppm·mol/s]}=0.195 \times 0.325/60 \times 10^6=1056.419 \quad (4)$$

Then, as shown in the following formula (5), a urea molar concentration needed in the reaction shown by formula (1) is calculated from the $NH_3$ molar concentration per second.

$$\text{Urea molar concentration [ppm·mol/s]}=1056.419 \times 2=2112.883 \quad (5)$$

Further, calculations are performed in accordance with the reaction formulae (1), (2), (3).

First, comparing the upstream NO concentration and the upstream $NO_2$ concentration, the upstream NO concentration is lower than the upstream $NO_2$ concentration, and therefore the entirety of NO reacts in the reaction formula (1). Therefore, an $NH_3$ molar concentration A used in the reaction formula (1) is represented by the following formula (6).

$$NH_3 \text{ molar concentration } A \text{ [ppm·mol/s]}=5.5238 \times 14.5 \times 2/22.4=7.151 \quad (6)$$

Since the entirety of NO flowing into the SCR catalyst 4 from upstream has reacted pursuant to the reaction formula (1), the amount of NO that reacts in the reaction formula (2) is 0. That is, in the case where the upstream NO concentration is lower than the upstream $NO_2$ concentration, as shown by the following formula (7), an $NH_3$ molar concentration B needed for purifying NO in the reaction formula (2) is 0.

$$NH_3 \text{ molar concentration } B \text{ [ppm·mol/s]}=5.5238 \times 0 \times 2/22.4=0 \quad (7)$$

Then, the remaining $NO_2$ that has not reacted pursuant to the reaction formula (1) reacts in the reaction formula (3).

Therefore, an $NH_3$ molar concentration C needed for purifying $NO_2$ in the reaction formula (3) is represented by the following formula (8).

$$NH_3 \text{ molar concentration } C \text{ [ppm·mol/s]} = 4/3 \times 5.5238 \times (41.5-14.5)/22.4 = 8.8775 \quad (8)$$

Next, comparing the downstream NO concentration and the downstream $NO_2$ concentration, the downstream $NO_2$ concentration is lower than the downstream NO concentration, and therefore, the entirety of $NO_2$ in the reaction formula (1) reacts.

Therefore, an $NH_3$ molar concentration D needed when the slipped $NO_2$ is purified pursuant to the reaction formula (1) is represented by the following formula (9).

$$NH_3 \text{ molar concentration } D \text{ [ppm·mol/s]} = 5.5238 \times 5 \times 2/22.4 = 2.46 \quad (9)$$

The amount of $NH_3$ needed for purifying the slipped NO on the downstream side is represented by the following formula (10) as an $NH_3$ molar concentration E needed when the slipped NO is purified pursuant to the reaction formula (2).

$$NH_3 \text{ molar concentration } E \text{ [ppm·mol/s]} = 5.5238 \times (15-5)/22.4 = 2.46 \quad (10)$$

Since the entirety of the downstream $NO_2$ reacts in the reaction formula (1), the amount of $NO_2$ that reacts in the reaction formula (3) is 0. That is, in the case where the downstream $NO_2$ concentration is lower than the downstream NO concentration, an $NH_3$ molar concentration F needed for purifying $NO_2$ in the reaction formula (3) is 0 as shown by the following formula (11).

$$NH_3 \text{ molar concentration } F \text{ [ppm·mol/s]} = 4/3 \times 5.5238 \times (0)/22.4 = 0 \quad (11)$$

From the above, the remaining ammonia at this time is represented by the following formula (12).

$$\text{Remaining amount [g] of } NH_3 \text{ at this time} = 17 \times [2112.883 - \{(A+B+C)-(D+E+F)-5.5238 \times 14.5/22.4\}] \times 0.01 \times 10^6 = 0.00015 \quad (12)$$

Therefore, the ammonia occlusion amount is represented by the following formula (13).

$$\text{Ammonia occlusion amount [g]} = \text{ammonia occlusion amount at previous time} + 0.00015 \quad (13)$$

After estimating the ammonia occlusion amount in S240, as shown in FIG. 7, in S250, a urea injection amount is calculated so that the ammonia occlusion amount estimated in S240 coincides with the corrected target occlusion amount calculated in S230. Then, in S260, on the basis of the urea injection amount calculated in S250, an injection cycle and a time period for one injection are set and injection of urea water by the urea water injector 5 is controlled. Thus, the injection control process is completed a first time.

In addition, the purification control device 12 executes a downstream ammonia concentration estimation process for estimating the downstream ammonia concentration.

Here, the procedure of the downstream ammonia concentration estimation process will be described. The downstream ammonia concentration estimation process is repeatedly executed every certain period (for example, every 10 ms) during operation of the purification control device 12.

Figure 9:
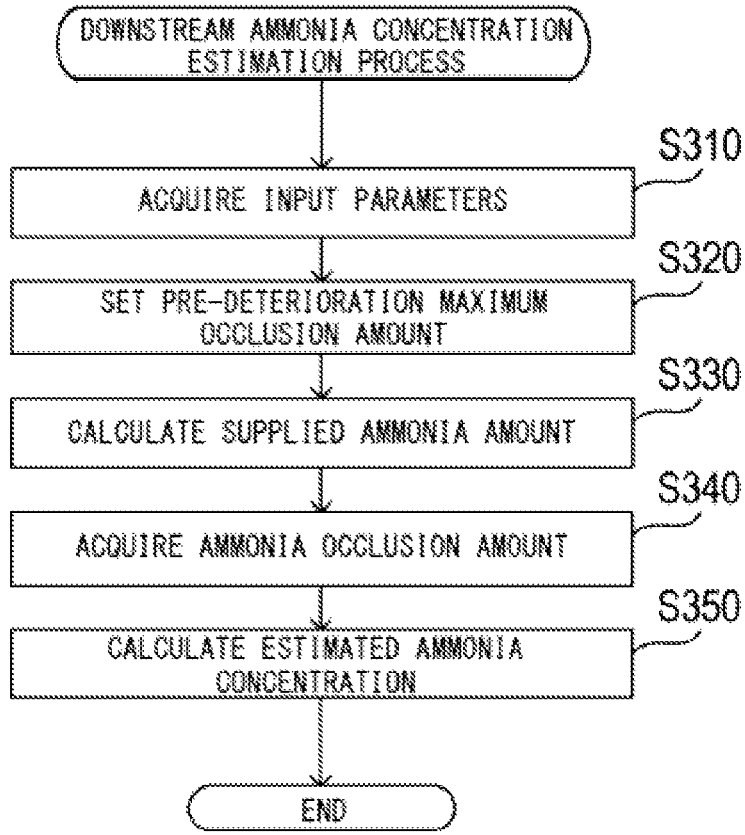
FIG. 9 is a flowchart showing a downstream ammonia concentration estimation process.

When the downstream ammonia concentration estimation process is executed, as shown in FIG. 9, first, in S310, the CPU 21 of the purification control device 12 performs processing of acquiring input parameters. Specifically, the input parameters are information indicating the upstream gas temperature, the downstream gas temperature, the upstream NOx concentration, the downstream NOx concentration, and the urea injection amount.

As in S210, the CPU 21 acquires the upstream gas temperature information and the downstream gas temperature information. In addition, the CPU 21 acquires the upstream NOx concentration information through communication performed with the upstream gas sensor control device 7. In addition, the CPU 21 acquires the downstream NOx concentration information through communication performed with the downstream gas sensor control device 9. In addition, the CPU 21 acquires the latest urea injection amount calculated in S250, as information (hereinafter, urea injection amount information) indicating the urea injection amount.

Then, in S320, a maximum value (hereinafter, pre-deterioration maximum occlusion amount) of the amount of ammonia to be occluded in the SCR catalyst 4 in a new state that has not been used at all, is set. In S320, first, based on the upstream gas temperature information and the downstream gas temperature information acquired in S310, the average of the upstream gas temperature and the downstream gas temperature is calculated as the SCR catalyst temperature. Next, using the calculated SCR catalyst temperature, the pre-deterioration maximum occlusion amount is set by referring to a maximum occlusion amount setting map in which the correspondence relationship between the SCR catalyst temperature and the pre-deterioration maximum occlusion amount is set in advance. The pre-deterioration maximum occlusion amount map is stored in the ROM 22.

Next, in S330, based on the urea injection amount information acquired in S310, the amount of ammonia (hereinafter, supplied ammonia amount) supplied to the SCR catalyst 4 is calculated. Further, in S340, information (hereinafter, ammonia occlusion amount information) indicating the latest ammonia occlusion amount estimated in S240 is acquired.

Then, in S350, based on the upstream NOx concentration information, the downstream NOx concentration information, the information indicating the pre-deterioration maximum occlusion amount set in S320, the ammonia occlusion amount information, and the information indicating the supplied ammonia amount calculated in S330, the concentration of ammonia discharged from the SCR catalyst 4 is calculated, and thus the downstream ammonia concentration estimation process is completed a first time.

In S350, first, based on the difference between the upstream NOx concentration and the downstream NOx concentration, the amount of ammonia (hereinafter, purification use amount) used for purifying NOx is calculated. In addition, based on the difference between the pre-deterioration maximum occlusion amount and the ammonia occlusion amount, the amount of ammonia (hereinafter, occlusion-possible ammonia amount) that can be occluded in the SCR catalyst 4 is calculated.

In addition, in S350, where the supplied ammonia amount is defined as Qa, the purification use amount is defined as Qb, the occlusion-possible ammonia amount is defined as Qc, and the amount of ammonia (hereinafter, discharged ammonia amount) discharged from the SCR catalyst 4 is defined as Qd, the discharged ammonia amount Qd is calculated by the following formula (14).

$$Qd = Qa - Qb - Qc \quad (14)$$

Then, in S350, the concentration of ammonia discharged from the SCR catalyst 4 is calculated based on the discharged ammonia amount Qd. Hereinafter, the ammonia concentration calculated in S350 is referred to as an estimated ammonia concentration.

In addition, the purification control device 12 executes a correction coefficient update process for updating the above correction coefficient Cc.

Here, the procedure of the correction coefficient update process will be described. The correction coefficient update process is repeatedly executed every certain period (for example, every 10 ms) during operation of the purification control device 12.

Figure 10:
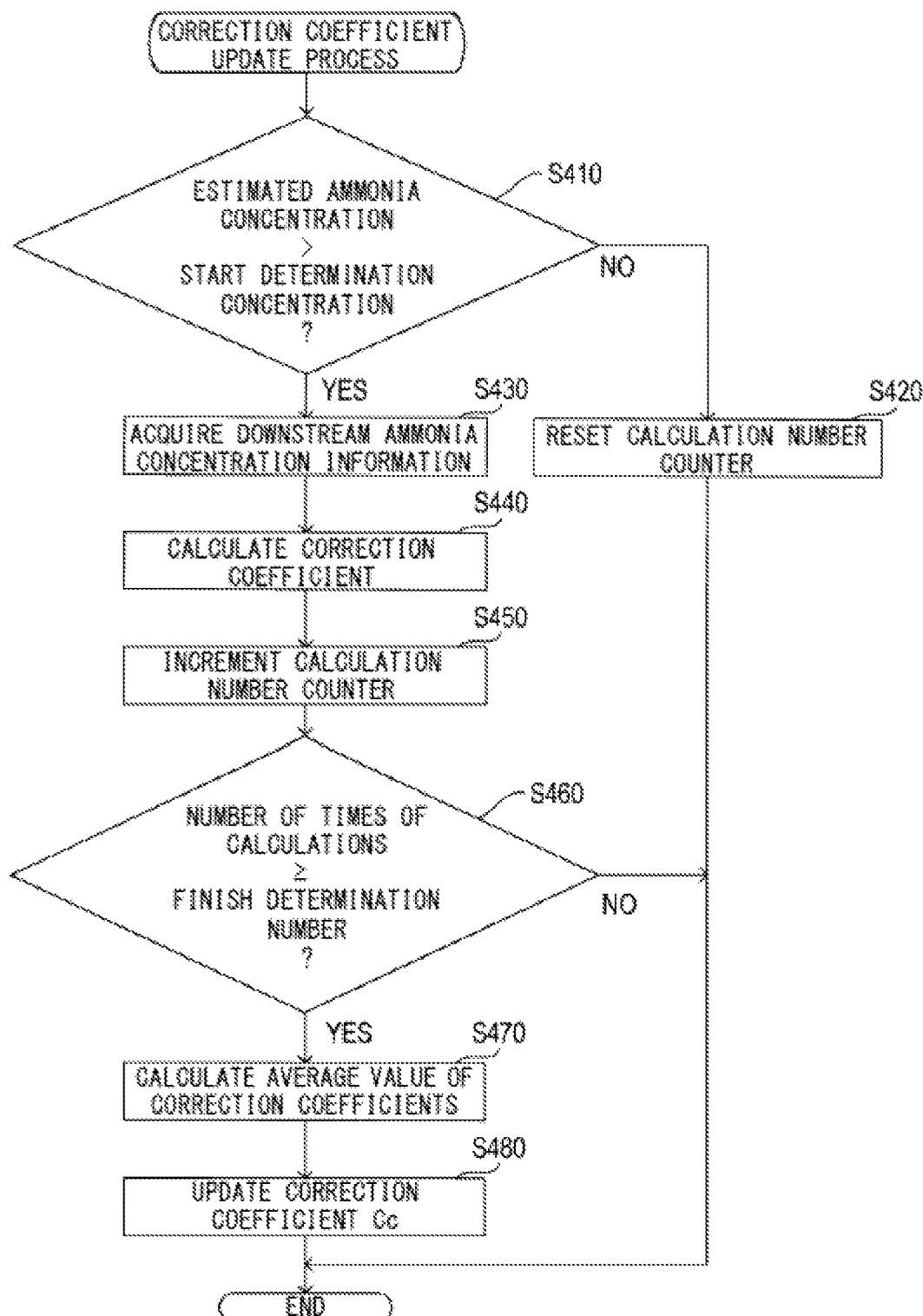
FIG. 10 is a flowchart showing a correction coefficient update process.

When the correction coefficient update process is executed, as shown in FIG. 10, first, in S410, the CPU 21 of the purification control device 12 determines whether or not the estimated ammonia concentration calculated in the downstream ammonia concentration estimation process exceeds a predetermined start determination concentration. In the present embodiment, the start determination concentration is set at 30 ppm.

Here, if the estimated ammonia concentration is equal to or lower than the start determination concentration, in S420, a calculation number counter provided in the RAM 23 is reset (i.e., set to 0), and thus the correction coefficient update process is once finished.

On the other hand, if the estimated ammonia concentration exceeds the start determination concentration, in S430, as in S210, the downstream ammonia concentration information is acquired. Further, in S440, the correction coefficient is calculated. Specifically, a division value obtained by dividing the latest estimated ammonia concentration calculating in S320 by the downstream ammonia concentration indicated by the downstream ammonia concentration information acquired in S430, is calculated as the correction coefficient. Then, the calculated correction coefficient is stored in the RAM 23. Then, in S450, the calculation number counter is incremented (i.e., 1 is added).

Further, in S460, whether or not the value (hereinafter, number of times of calculations) of the calculation number counter is equal to or greater than a predetermined finish determination number, is determined. In the present embodiment, the finish determination number is set at 10. Here, if the number of times of calculations is smaller than the finish determination number, the correction coefficient update process is completed a first time.

On the other hand, if the number of times of calculations is equal to or greater than the finish determination number, in S470, the average value of the last ten correction coefficients stored in the RAM 23 is calculated. Then, in S480, the average value calculated in S470 is stored in the correction coefficient Cc provided in the RAM 23, to update the correction coefficient Cc, and thus the correction coefficient update process is completed a first time.

Figure 11:
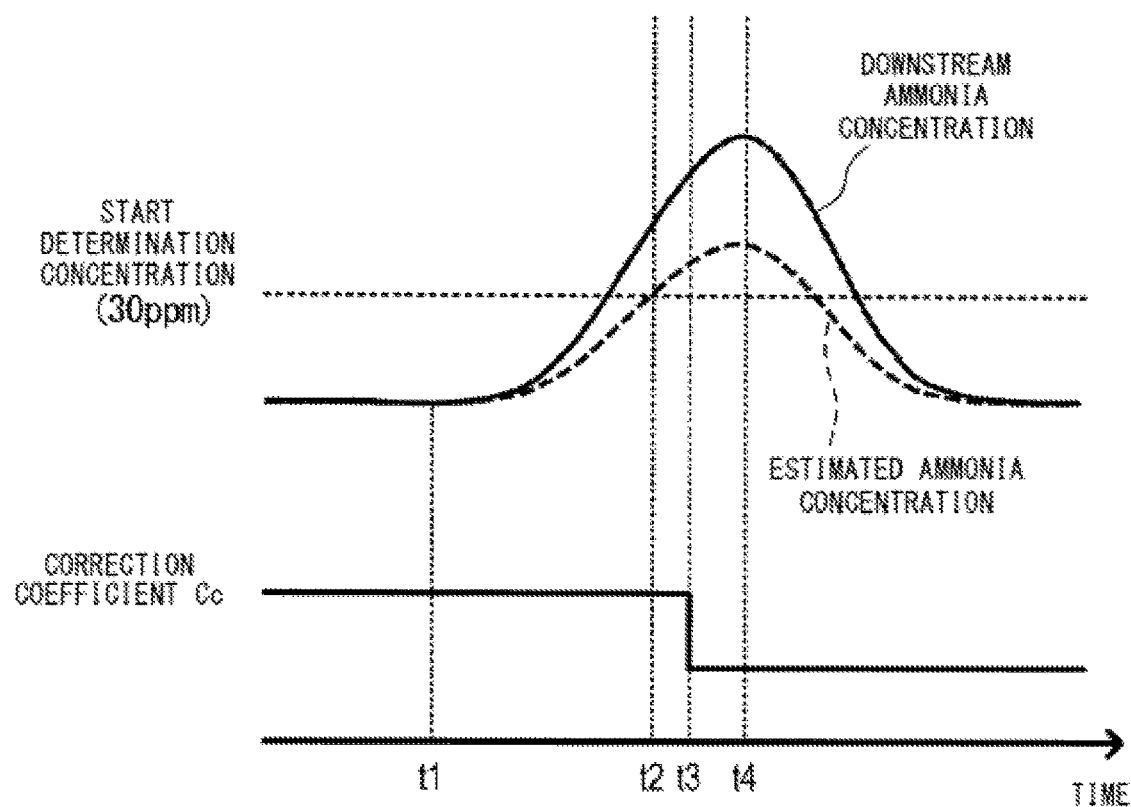
FIG. 11 is a timing chart showing a specific example of a downstream ammonia concentration, an estimated ammonia concentration, and a correction coefficient Cc.

Here, a specific example of updating the correction coefficient Cc will be described. As shown in FIG. 11, it is assumed that, at time t1, the downstream ammonia concentration and the estimated ammonia concentration start to increase, and at time t2, the estimated ammonia concentration exceeds the start determination concentration. Accordingly, the CPU 21 of the purification control device 12 starts calculating the correction coefficient at time t2. Then, it is assumed that the CPU 21 of the purification control device 12 finishes calculation of the correction coefficients, the number of which corresponds to the finish determination number, at time t3. Thus, at time t3, the CPU 21 of the purification control device 12 calculates the average value of the correction coefficients and updates the correction coefficient Cc.

The purification control device 12 configured as described above controls the urea water injector 5 which supplies urea as a reducing agent to the SCR catalyst 4 provided to the exhaust pipe 52 of the diesel engine 51 in order to purify NOx contained in the exhaust gas discharged from the diesel engine 51.

The purification control device 12 acquires the upstream NOx concentration information, the downstream NOx concentration information, the urea injection amount information, the upstream gas temperature information, the downstream gas temperature information, and the ammonia occlusion amount information.

The purification control device 12 sets the pre-deterioration maximum occlusion amount based on the SCR catalyst temperature calculated using the upstream gas temperature information and the downstream gas temperature information.

The purification control device 12 estimates, as the estimated ammonia concentration, the concentration of ammonia discharged from the SCR catalyst 4, based on the upstream NOx concentration information, the downstream NOx concentration information, the urea injection amount information, the pre-deterioration maximum occlusion amount, and the ammonia occlusion amount information.

The purification control device 12 acquires the downstream ammonia concentration information. If the downstream ammonia concentration is greater than the estimated ammonia concentration, the purification control device 12 decreases the supply amount of urea from the urea water injector 5.

As described above, the purification control device 12 estimates the estimated ammonia concentration based on the amount of ammonia (i.e., pre-deterioration maximum occlusion amount) that can be occluded by the SCR catalyst 4 before the SCR catalyst 4 is deteriorated. The pre-deterioration maximum occlusion amount is greater than the amount of ammonia that can be occluded when the SCR catalyst 4 is deteriorated. Therefore, if the amount of ammonia that can be occluded by the SCR catalyst 4 decreases as a result of deterioration of the SCR catalyst 4, the downstream ammonia concentration indicating the concentration of ammonia actually discharged from the SCR catalyst 4 becomes greater than the estimated ammonia concentration. That is, in the purification control device 12, if the downstream ammonia concentration is greater than the estimated ammonia concentration, a determination can be made that the SCR catalyst 4 is deteriorated.

Then, if the downstream ammonia concentration is greater than the estimated ammonia concentration, the purification control device 12 decreases the supply amount of urea from the urea water injector 5. Thus, when the SCR catalyst 4 is deteriorated, discharge of ammonia from the SCR catalyst 4 can be suppressed.

In addition, the purification control device 12 calculates, as the correction coefficient, a division value obtained by dividing the estimated ammonia concentration by the downstream ammonia concentration. Then, the purification control device 12 decreases the supply amount of urea from the urea water injector 5, on the basis of the calculated correction coefficient.

As the downstream ammonia concentration increases as compared to the estimated ammonia concentration, the correction coefficient decreases. Therefore, by decreasing the supply amount based on the correction coefficient, the purification control device 12 can decrease the supply amount as the downstream ammonia concentration increases. Thus, in accordance with the deterioration degree of the SCR catalyst 4, the purification control device 12 can suppress discharge of ammonia from the SCR catalyst 4.

In addition, the purification control device 12 repeatedly calculates the division value obtained by dividing the estimated ammonia concentration by the downstream ammonia concentration, for a predetermined number of times of calculations, and calculates the average of the calculated division values as the correction coefficient Cc. Thus, the purification control device 12 smooths time-series data of the division values, whereby a sharp change in the correction coefficient Cc can be suppressed.

In addition, the purification control device 12 determines whether or not the estimated ammonia concentration exceeds the start determination concentration. If the estimated ammonia concentration does not exceed the start determination concentration, the purification control device 12 prohibits calculation of the correction coefficient Cc. In this way, in the purification control device 12, calculation of the correction coefficient is performed when the downstream ammonia concentration is greater than the start determination concentration. Therefore, a detection result of the downstream ammonia concentration by the downstream multi-gas sensor 8 is less likely to be influenced by noise, whereby the purification control device 12 can suppress a decrease in reliability of the correction coefficient Cc.

In addition, the purification control device 12 sets the target occlusion amount. Further, the purification control device 12 controls the supply amount of urea from the urea water injector 5 so that the amount of ammonia to be occluded in the SCR catalyst 4 coincides with the target occlusion amount. Then, the purification control device 12 performs an update using a value obtained by multiplying the target occlusion amount and the correction coefficient Cc, as a new target occlusion amount, thereby decreasing the supply amount of urea from the urea water injector 5.

As described above, the purification control device 12 can decrease the supply amount through a simple calculation of multiplying the target occlusion amount by the correction coefficient Cc, whereby the processing load on the purification control device 12 can be decreased.

In the embodiment described above, the diesel engine 51 corresponds to an internal combustion engine, the SCR catalyst 4 corresponds to a selective reduction catalyst, and a urea water injector 5 corresponds to a urea supply device.

In addition, the upstream NOx concentration information corresponds to information that allows the upstream NOx concentration to be specified, the downstream NOx concentration information corresponds to information that allows the downstream NOx concentration to be specified, and the urea injection amount information corresponds to information that allows the supplied ammonia amount to be specified. In addition, the upstream gas temperature information and the downstream gas temperature information correspond to information that allows the catalyst temperature to be specified, and the downstream ammonia concentration information corresponds to information that allows the downstream ammonia concentration to be specified.

In addition, S310 corresponds to processing by a first information acquisition unit, S320 corresponds to processing by an occlusion amount setting unit, S350 corresponds to processing by an estimation unit, S430 corresponds to processing by a second information acquisition unit, and S230 corresponds to processing by a decreasing unit.

In addition, S440 to S480 correspond to processing by a coefficient calculation unit, S410 corresponds to processing by a prohibition unit, S220 corresponds to processing by a target setting unit, and S250 corresponds to processing by a supply amount control unit.

Although one embodiment of the present disclosure has been described above, the present disclosure is not limited to the above embodiment but may be modified so as to be carried out in various manners.

For example, in the above embodiment, the division value obtained by dividing the estimated ammonia concentration by the downstream ammonia concentration is repeatedly calculated a predetermined number of times, and the average of the calculated division values is calculated as the correction coefficient Cc. However, the division value obtained by dividing the estimated ammonia concentration at a time when the estimated ammonia concentration is at a peak (hereinafter, concentration peak time) by the downstream ammonia concentration at the concentration peak time, may be calculated as the correction coefficient Cc. For example, as shown in FIG. 11, since the estimated ammonia concentration is at a peak at time t4, the division value obtained by dividing the estimated ammonia concentration at time t4 by the downstream ammonia concentration at time t4 may be calculated as the correction coefficient Cc.

In the purification control device 12 configured as described above, the correction coefficient Cc is calculated when the downstream ammonia concentration is also at a high value close to the peak. Therefore, a detection result for the downstream ammonia concentration by the downstream multi-gas sensor 8 is less likely to be influenced by noise, whereby the purification control device 12 can suppress a decrease in reliability of the correction coefficient Cc.

In the above embodiment, the average of the upstream gas temperature and the downstream gas temperature is calculated as the SCR catalyst temperature. However, the method for calculating the SCR catalyst temperature is not limited thereto. For example, a detection result by a temperature sensor which directly detects the temperature of the SCR catalyst 4 may be employed as the SCR catalyst temperature, or the SCR catalyst temperature may be estimated based on the state of the diesel engine 51.

A function of one component in the above embodiment may be implemented by a plurality of components, or functions of a plurality of components may be implemented by one component. Some of the components in the above embodiment may be omitted. At least some of the components in the above embodiment may, for example, be added to or replace another component in the above embodiment.

Besides the purification control device 12 described above, the present disclosure can also be implemented in various manners, e.g., a system including the purification control device 12, a program for causing a computer to function as the purification control device 12, a medium having such a program stored therein, or a purification control method.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. JP 2018-090756 filed May 9, 2018, the disclosure of which is incorporated herein by reference in its entirety.

What is claimed is:

1. A purification control device which controls a urea supply device for supplying urea as a reducing agent to a selective reduction catalyst provided in an exhaust pipe of an internal combustion engine in order to purify NOx contained in an exhaust gas discharged from the internal combustion engine, the purification control device comprising:
   a first information acquisition unit configured to acquire at least information that allows an upstream NOx concentration, a downstream NOx concentration, a supplied ammonia amount, and a catalyst temperature to be specified, wherein the upstream NOx concentration is a concentration of NOx contained in the exhaust gas flowing into the selective reduction catalyst, the downstream NOx concentration is a concentration of NOx contained in the exhaust gas discharged from the selective reduction catalyst, the supplied ammonia amount is an amount of ammonia supplied to the selective reduction catalyst, and the catalyst temperature is a temperature of the selective reduction catalyst;
   an occlusion amount setting unit configured to set a pre-deterioration maximum occlusion amount based on at least the catalyst temperature, wherein the pre-deterioration maximum occlusion amount is a maximum value of an amount of ammonia to be occluded in the selective reduction catalyst before the selective reduction catalyst is deteriorated;
   an estimation unit configured to estimate a concentration of ammonia discharged from the selective reduction catalyst, as an estimated ammonia concentration, based on at least information that allows the upstream NOx concentration to be specified, information that allows the downstream NOx concentration to be specified, information that allows the supplied ammonia amount to be specified, and the pre-deterioration maximum occlusion amount;
   a second information acquisition unit configured to acquire information that allows a downstream ammonia concentration to be specified, wherein the downstream ammonia concentration is a concentration of ammonia contained in the exhaust gas discharged from the selective reduction catalyst; and
   a decreasing unit configured to decrease a supply amount of urea from the urea supply device when the downstream ammonia concentration is greater than the estimated ammonia concentration.

2. The purification control device as claimed in claim 1, further comprising a coefficient calculation unit configured to calculate, as a correction coefficient, a division value obtained by dividing the estimated ammonia concentration by the downstream ammonia concentration, wherein
   the decreasing unit decreases the supply amount based on the correction coefficient calculated by the coefficient calculation unit.

3. The purification control device as claimed in claim 2, wherein
   the coefficient calculation unit repeatedly calculates the division value obtained by dividing the estimated ammonia concentration by the downstream ammonia concentration, for a number of times of calculations set to be greater than 1 in advance, and calculates an average of the calculated division values, as the correction coefficient.

4. The purification control device as claimed in claim 2, wherein
   with a concentration peak time defined as a time when the estimated ammonia concentration is at a peak, the coefficient calculation unit calculates, as the correction coefficient, the division value obtained by dividing the estimated ammonia concentration at the concentration peak time by the downstream ammonia concentration at the concentration peak time.

5. The purification control device as claimed in claim 2, further comprising a prohibition unit configured to determine whether or not the estimated ammonia concentration is equal to or smaller than a predetermined start determination concentration, and to prohibit calculation of the correction coefficient by the coefficient calculation unit when the estimated ammonia concentration is equal to or smaller than the start determination concentration.

6. The purification control device as claimed in claim 2, further comprising:
   a target setting unit configured to set a target occlusion amount which is a target value for an amount of ammonia to be occluded in the selective reduction catalyst; and
   a supply amount control unit configured to control the supply amount so that the amount of ammonia to be occluded in the selective reduction catalyst coincides with the target occlusion amount, wherein
   the decreasing unit decreases the supply amount by updating the target occlusion amount using, as a new target occlusion amount, a value obtained by multiplying the target occlusion amount and the correction coefficient.

* * * * *